United States Patent [19]

Gay et al.

[11] Patent Number: 5,045,846
[45] Date of Patent: Sep. 3, 1991

[54] METHOD OF ADJUSTING THE COLORS OF A POLYCHROME PLASMA PANEL AND A PLASMA PANEL USING SUCH A METHOD

[75] Inventors: Michel Gay, Le Fontanil; Jacques Deschamps, Grenoble, both of France

[73] Assignee: Thomson-CSF, Paris, France

[21] Appl. No.: 520,467

[22] Filed: May 8, 1990

Related U.S. Application Data

[63] Continuation of Ser. No. 167,378, Mar. 14, 1988, abandoned.

[30] Foreign Application Priority Data

Mar. 13, 1987 [FR] France .............................. 87 03456

[51] Int. Cl.$^5$ .............................................. G09G 3/28
[52] U.S. Cl. ................................... 340/772; 340/702; 315/169.4
[58] Field of Search ............... 340/702, 704, 767, 777, 340/772, 805; 315/169.1, 169.4

[56] References Cited

U.S. PATENT DOCUMENTS

| | | | |
|---|---|---|---|
| 4,149,111 | 4/1979 | Coates, Jr. | 340/767 |
| 4,513,281 | 4/1985 | Ngo | 340/772 |
| 4,772,885 | 9/1988 | Uehara et al. | 340/702 |

Primary Examiner—Jeffery A. Brier
Attorney, Agent, or Firm—Roland Plottel

[57] ABSTRACT

A method of adjusting the colors of a polychrome plasma panel is provided, including a plurality of elementary image points, each point being formed by several zones covered with luminophores of different colors, each of these zones corresponding to the intersection of electrodes for applying control signals and more particularly a holding signal to each zone during operation, which method consists in applying to the different zones of each elementary image point a respective holding signal at an adjustable frequency, identical for all the luminophores of the same type of all the image points of the panel, and the colors of the panel are adjusted by adjusting the frequency of the different holding signals used.

6 Claims, 2 Drawing Sheets

FIG_1
PRIOR ART
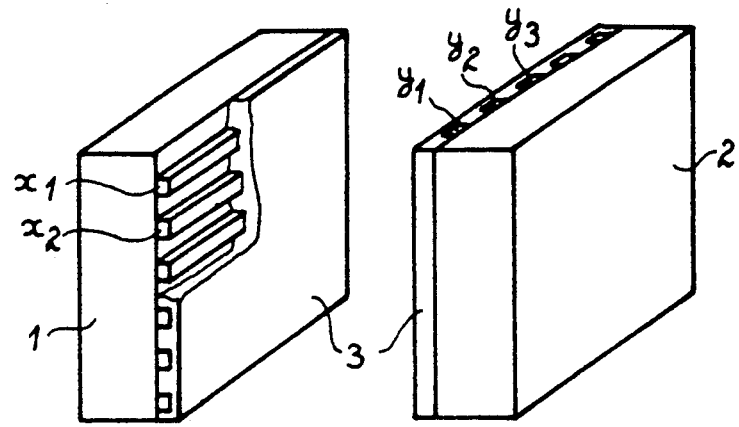
FIG_2
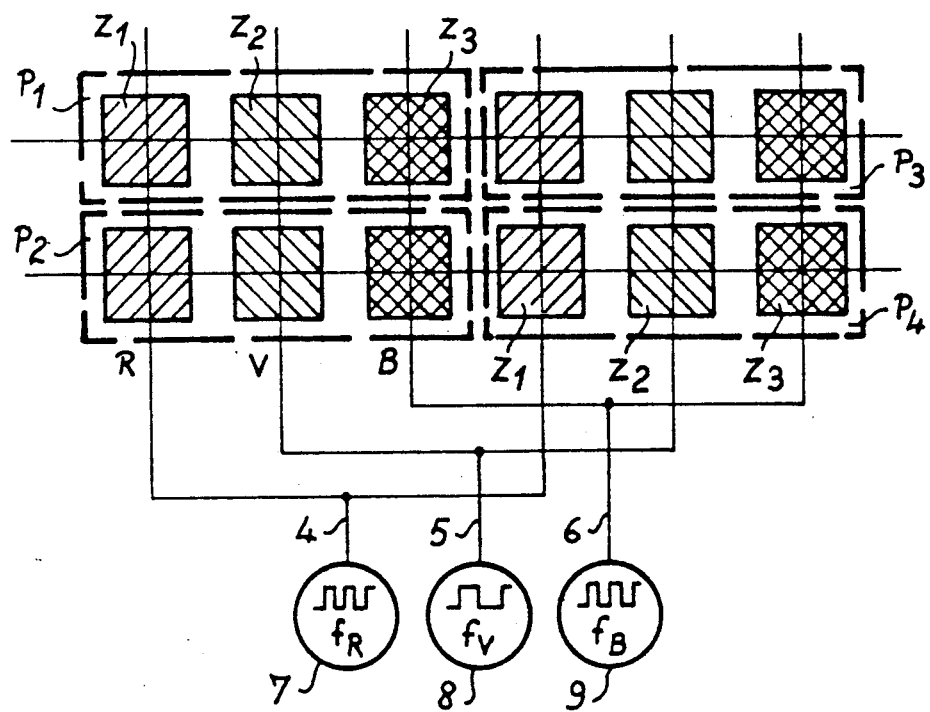

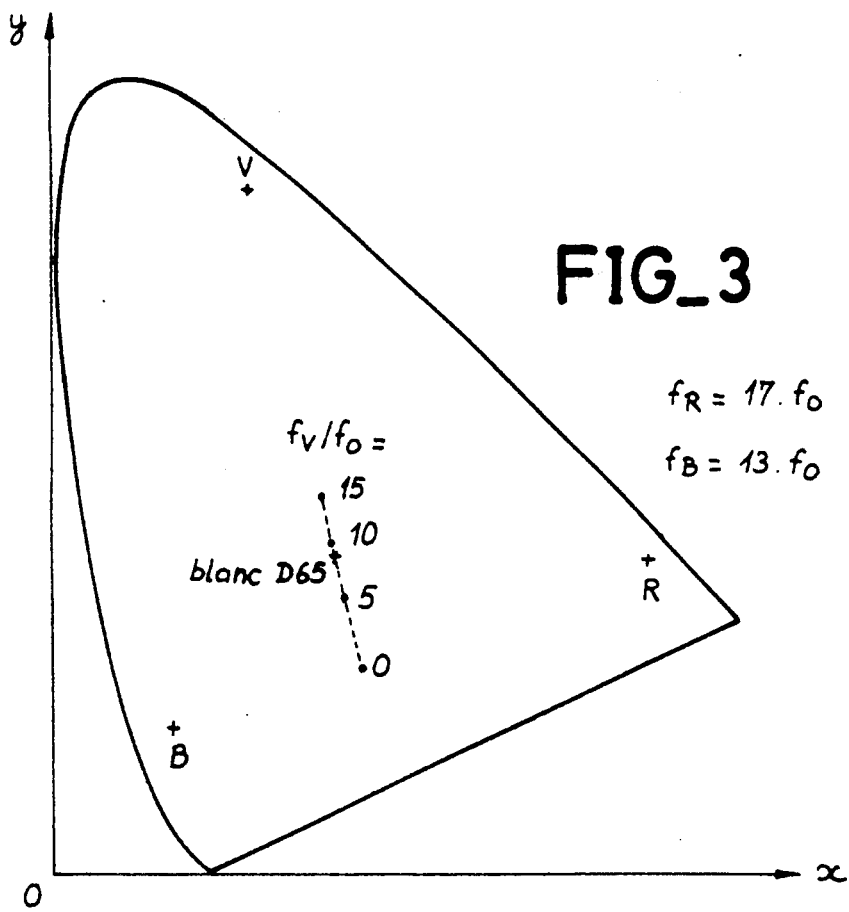
FIG_3
$f_R = 17 \cdot f_0$
$f_B = 13 \cdot f_0$
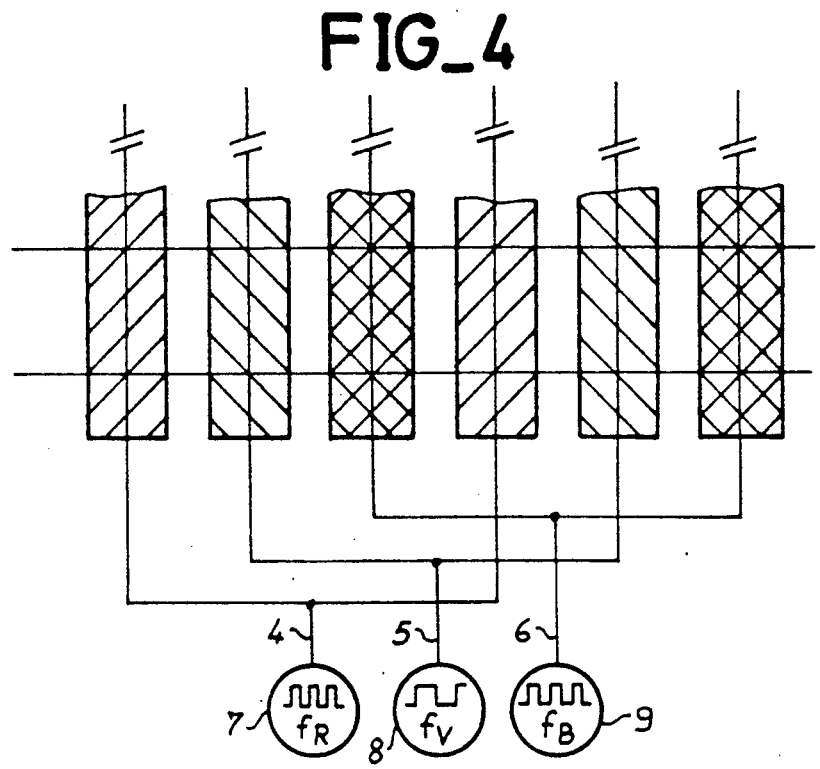
FIG_4

METHOD OF ADJUSTING THE COLORS OF A POLYCHROME PLASMA PANEL AND A PLASMA PANEL USING SUCH A METHOD

This application is a continuation of application Ser. No. 07/167,378, filed Mar. 14, 1988 now abandoned.

BACKGROUND OF THE INVENTION

The present invention relates to a method for adjusting the colors of a polychrome plasma panel. It also relates to plasma panels using such a method.

Plasma panels are well known in the prior art. At the present time, the plasma panels which are commercialized are all monochrome, i.e. they emit light of a single color, which is usually orangey red.

Studies are being carried out in numerous research laboratories for improving polychrome panels.

To form polychrome panels it is known to dispose luminophores (luminescent materials) of different colors inside each panel. Each elementary image point of the panel is then formed by the juxtaposition of several zones of small size covered with luminophores of different colors and each of these zones corresponds to the intersection of electrodes receiving control signals.

The display of information on a plasma panel is achieved by creating luminescent discharges within a gas, contained in the space between two glass plates carrying the electrodes of the panel. The ultraviolet rays emitted during discharges excite the luminophore covered zones. The luminophores then emit by photoluminescence a visible light whose color is determined by the nature of the luminophore. Generally two or three luminophores of different colors are used, which makes it possible to obtain respectively one or four additional colors. Thus, for example, in the case of a panel in which each elementary image point comprises three zones covered with three different luminophores, respectively of red, green and blue colors, it is possible to further obtain yellow by combining the light emitted by the red and green luminophores, cyan by combining green and blue, magenta by combining red and blue and white by combining red, green and blue.

A problem arises in polychrome plasma panels which is that of balancing the basic colors, namely the colors coming from a single luminophore, so as to obtain exactly the desired shades of color when several of these basic colors are combined by simultaneously exciting several luminophores.

At the present time, adjustment of the colors of a panel is provided, as a function of the light and colorimetric characteristics of each of the luminophores used, by the geometry of the luminophore covered zones and by their number inside each elementary image point.

The possibilities of balancing the colors are thus fairly limited for the geometry of the luminophore covered zone cannot be modified in large proportions and the total number of luminophore covered zones per elementary image point cannot become too great: thus, when three luminophores of different colors are used, each elementary image point cannot reasonably comprise more than three or four zones.

Furthermore, such balancing possibilities cannot be used for overcoming the differences found experimentally from one panel to another, for they can only be put into practice during manufacture of the panels.

The present invention solves the above mentioned problem in a simple and efficient way.

SUMMARY OF THE INVENTION

The present invention provides a method of adjusting the colors of a polychrome plasma panel, including a plurality of elementary image points, each point being formed by several zones covered with luminophores of different colors, each of these zones corresponding to the intersection of electrodes for applying control signals and more particularly a holding signal to each zone during operation, which method consists in applying to the different zones of each elementary image point a respective holding signal at an adjustable frequency, identical for all the luminophores of the same type of all the image points of the panel, and the colors of the panel are adjusted by adjusting the frequency of the different holding signals used.

The invention provides then electronic adjustment of the colors which may be adapted to each panel, even after it has been manufactured. The adjustment of the colors thus achieved may be very precise and if required may complete adjustment carried out in a known way, for example by modifying the geometry and the number of luminophore covered zones.

BRIEF DESCRIPTION OF THE DRAWINGS

Other objects, characteristics and results of the invention will be clear from the following description given by way of non limitative example and illustrated by the accompanying Figs. which show:

FIG. 1, a schematical perspective view of one embodiment of an AC type plasma panel of the prior art;

FIGS. 2 and 4, two variants showing the formation of some elementary image points in the case of a polychrome panel of the invention;

FIG. 3, a diagram of the colors formed in the embodiment of the invention as shown in FIG. 2.

In the different Figs., the same references designate the same elements but, for the sake of clarity, the sizes and proportions of the different elements have not been respected.

DESCRIPTION OF THE PREFERRED EMBODIMENTS

FIG. 1 shows schematically one embodiment of a known alternating type plasma panel of the prior art.

This panel comprises two glass plates 1 and 2 each carrying a network of electrodes parallel to each other, $X_1$, $X_2$, $X_3$ and $Y_1$, $Y_2$, $Y_3$... which are covered with a dielectric layer 3. The two plates are assembled together and sealed so that the two electrode networks are perpendicular to each other and so that a very small distance exists between the two facing dielectric layers 3. This space between the two dielectric layers is filled with a gas, generally a neon based gas.

FIG. 2 shows schematically one example of forming some elementary image points for a polychrome panel controlled in accordance with the invention.

In FIG. 2 four adjacent elementary image points have been shown, $P_1$, $P_2$, $P_3$, $P_4$. For the sake of clarity, each of these points is defined by a broken line rectangle. Since it is a trichromatic panel, each elementary image point comprises three adjacent zones $Z_1$, $Z_2$, $Z_3$, of small dimensions and square shape, for example each of these zones being covered by a luminophore of different color. For example, there may be a luminophore of red color, one of green color and one of blue. Each luminophore covered zone corresponds to the intersection of two perpendicular electrodes as shown in FIG. 1, each carried by one of the plates of the panel and receiving control signals proper to this zone.

In FIG. 2, the intersection of the two electrodes related to a luminophore covered zone corresponds substantially to the middle point of the square forming the zone. These plasma panels are of the AC type. Because of the presence of the dielectric layer 3 which covers each electrode network, these panels have an internal memory. The control of these panels includes, in a way known per se, two steps:

an addressing step, during which discharges are created at some elementary image points which have been selected, a holding step, during which the internal memory of the panel is used for generating repetitively, between two addressing operations, new discharges solely for the elementary image points which have been previously addressed. The holding signal is a periodic signal, in the form of square waves, and is therefore formed by alternating positive and negative voltages. At each change of sign of the voltage, a new electric discharge is created and so there is light emission. Consequently, the luminence of the panel is, in a first approximation, proportional to the frequency of the holding signal.

The invention uses this characteristic and consists in attributing to each of the different types of luminophores used in the panel a particular adjustable holding frequency. Thus, by modifying this holding frequency, the luminence due to each type of luminophore can be adjusted and so the plasma panel colors: the three red, green and blue luminophores which cover the three zones forming each elementary image point are shown by the references R, V, B and by respective hatching or cross ruling. These vertical electrodes corresponding to zones covered with luminophores of the same type are interconnected. Thus three connections are obtained 4, 5 and 6 which are connected symbolically to three generators 7, 8, 9 producing holding signals of different frequencies $f_R$, $f_V$, $f_B$. The holding signals are shown in circles symbolizing the generators. These generators have adjustable frequencies.

By modifying the frequency of the holding signals applied to each type of luminophore, the amount of light due to each type of luminophore is modified and the combined colors of the panel can be adjusted, namely those which are obtained by exciting several luminophores of different types in an elementary image point.

Thus, the frequencies $f_R$, $f_V$, $f_B$ can be adjusted continuously. In this case, these frequencies are independent of each other.

These frequencies can also be adjusted discretely in whole multiples of a basic frequency $f_o$. In this case, the holding signals are regularly in the same state, with a period equal to $1/f_o$.

Adjustment of the ratios $f_R/f_o$, $f_V/f_o$ and $f_B/f_o$ is provided more especially as a function of the colorimetric characteristics of the luminophores and of their experimentally measured light yields.

FIG. 3 shows a diagram of the colors formed in accordance with the standards of the CIE 1960. This diagram has been drawn up for the case where three different luminophores are used of red, green and blue colors for each elementary image point. The results are given for the following luminophores, having the same energy yield:

for the red, a luminophore of formula ($YVO_4$: Eu) complying with the specifications of JEDEC P 22 4;

for the green, a luminophore of formula ($Zn Si O_4$: Mn), complying with the specifications of JEDEC P 1;

for the blue, a luminophore of formula ZnS Ag complying with the JEDEC P 11 specifications.

In the diagram of FIG. 3, the visible colors are contained inside a substantially triangular geometrical figure. This diagram has been drawn up using the standardized color coordinates x and y. The letters R, V, B indicate the three three basic red, green and blue colors used.

The holding frequencies $f_R$, $f_V$, $f_B$ of the red, green and blue luminophore covered zones may vary discretely, in whole multiples of a basic frequency $f_o$ as mentioned above.

FIG. 3 shows what happens with $f_R = 17 f_o$, $f_B = 13 f_o$ and the ratio $f_V/f_o$ which is variable from zero to 15 while keeping whole values, and attempting to obtain a substantially perfect white by combining the three basic red, green and blue colors.

When the ratio $f_V/f_o$ is equal to 9, a practically perfect white is obtained, very close to the white $D_{65}$, which corresponds to a color temperature of 6500K.

If $f_o = 4$ KHz, the following holding frequencies must then be applied to the three luminophores of the panel so as to obtain this substantially perfect white:

$f_R = 68$ KHz $f_V = 36$ KHz $f_B = 52$ KHz

The holding sequence is reproduced identical to itself with a period equal to $1/f_o$, namely 250 microseconds.

The invention provides color balancing which may be very fine and may be carried out throughout a wide adjustment range.

Such balancing has the advantage of being able to be carried out once the panel is finished, without it being necessary to modify its structure and when the light characteristics of the panel can be determined experimentally.

Such balancing may be used as a complement to the solutions already known for color balancing, such as the geometry of the luminophore covered zones and their number inside each elementary image point.

FIG. 4 shows one embodiment of the invention which differs from the embodiment shown in FIG. 2 only by the form of the luminophores, deposited in continuous strips which cover several elementary image points. This embodiment shown in FIG. 4 is easier to manufacture than that described with reference to FIG. 2 and the fact that the luminophores are deposited in continuous strips results in no disadvantages in so far as the operation of the panel is concerned.

The invention applies to all memory plasma panels.

In particular, in the case of alternating type plasma panels, the invention applies whatever the structure of these panels, whether it is a question of a conventional structure such as that illustrated in FIG. 1, or other structures such, for example, as that described in the international patent application WO 83/03496 where all the electrodes are carried by the same glass plate, or, for example that described in the European patent 0 135 382 where the holding signals are applied to parallel electrodes.

The invention also applies to plasma panels of continuous type but only if they have a holding memory at one level or another. These panels differ from the alternating type plasma panels in that they do not have a dielectric layer 3 separating the electrodes from the gas. Some panels do not have an internal memory but may be associated with a memory external to the panel properly speaking, but internal to the display module.

The invention applies generally to plasma panels requiring holding, several thousands of times per second, applied to all the points of the panel simultaneously or to a set of parallel points.

Finally, the invention applies to all polychrome panels, whether they use two, three or more than three luminophores of different colors for each elementary image point.

What is claimed is:

1. A glow discharge panel comprising:
   means for providing a plurality of red, blue, and green color sources on said panel;
   means for providing a first alternating frequency holding signal to all of said red color sources;
   means for providing a second alternating frequency holding signal to all of said blue color sources;
   means for providing a third alternating frequency holding signal to all of said green color sources;
   means for adjusting the frequency of at least two of said alternating frequency holding signals; and
   wherein each of said color sources comprises two plates, with electrodes on at least one plate, and an ionizable gas between the plates which ionizable gas emits ultra-violet radiation in response to the gas being ionized by signals, including said holding signal, being applied to said electrodes, and further comprising luminescent material on one of said plates and which emits the colored light when said emitted ultra-violet radiation is received thereon from said ionized gas;
   whereby in accordance with the adjusted frequencies of said holding signals, a desired color balance of said panel is achieved.

2. A glow discharge panel comprising:
   means for providing a plurality of different color sources on said panel;
   means for providing separate and different alternating frequency color signals to all of said different color sources of the same color;
   means for adjusting the frequency of at least one of said alternating frequency holding signals; and
   wherein each of said color sources comprises two plates, with electrodes on at least one plate, and an ionizable gas between the plates which ionizable gas emits ultra-violet radiation in response to the gas being ionized by signals, including said holding signal, being applied to said electrodes, and further comprising luminescent material on one of said plates and which emits the colored light when said emitted ultra-violet radiation is received thereon from said ionized gas;
   whereby in accordance with the adjusted frequency of said holding signal a desired colored balance of said panel is achieved.

3. A panel according to claim 1, or claim 2, wherein each of said color sources comprises a lumiphore of said color and a source of ultra-violent radiation, which ultra-violet radiation is converted into light of said color by said lumiphore.

4. A panel according to claim 1 or claim 2, wherein said color sources are substantially all of the same size, and the frequency of the red holding signal is about 68 KHz, the frequency of the green holding signal is about 36 KHz, and the frequency of the blue holding signal is about 52 KHz.

5. A panel according to claim 1 or claim 2, further comprising means for selecting the adjusting frequencies after the panel has been finished, and after experimentally determining the light characteristics of the panel.

6. A panel according to claim 1 or claim 2, wherein said color sources are arranged as part of continuous color strips.

* * * * *